United States Patent [19]

Matsuda

[11] Patent Number: 4,667,176
[45] Date of Patent: May 19, 1987

[54] FAILURE-MONITOR SYSTEM FOR AN AUTOMOTIVE DIGITAL CONTROL SYSTEM

[75] Inventor: Toshiro Matsuda, Sagamihara, Japan

[73] Assignee: Nissan Motor Company, Limited, Yokohama, Japan

[21] Appl. No.: 610,003

[22] Filed: May 14, 1984

[30] Foreign Application Priority Data

May 17, 1983 [JP] Japan .................................. 58-84903

[51] Int. Cl.⁴ .............................................. B60Q 1/00
[52] U.S. Cl. ................................ 340/52 F; 340/52 R; 340/693; 307/10 R; 365/228
[58] Field of Search .................. 340/52 F, 52 R, 52 B, 340/693; 307/10 R; 364/200; 73/117.3; 365/228

[56] References Cited

U.S. PATENT DOCUMENTS 4,258,421 3/1981 Juhasz et al. ............... 340/870.16 X
4,497,057 1/1985 Kato et al. .................... 340/52 F X Primary Examiner—James L. Rowland
Assistant Examiner—Jeffery A. Hofsass
Attorney, Agent, or Firm—Schwartz, Jeffery, Schwaab, Mack, Blumenthal & Evans

[57] ABSTRACT

A failure-monitor system for a digital control system includes one or more fault indicators which are adapted to turn on in response to failure of corresponding elements of the digital control system. The failure-monitor system is associated with a preselected switch operated when the vehicle is moving, such as an ignition switch, and responsive to turning on of the switch to initialize the failure-monitor system after maintenance has been completed. The failure-monitor system also includes an alarm indicator which is turned on when malfunction of one of the segments or elements of the digital control system is detected.

6 Claims, 5 Drawing Figures

4,667,176

FAILURE-MONITOR SYSTEM FOR AN AUTOMOTIVE DIGITAL CONTROL SYSTEM

BACKGROUND OF THE INVENTION

The present invention relates generally to a digital control system for controlling an internal combustion engine, an automotive brake system, an air conditioning system or the like. More particularly, the invention relates to a failure-monitor system for a digital control system, which includes one or more failure-indicators which turn on when the corresponding elements fail and can be reset automatically.

In general, it would make maintenance easier to provide a failure-monitor for a digital control system for the purpose of indicating faulty elements. Various systems for detecting failure of sensors and/or actuators and of course digital controllers per se are known in the prior art. Some such failure detecting systems include failure-monitors for indicating or identifying malfunctioning elements of the control system when the control system fails.

For example, U.S. Pat. No. 4,402,217, issued on Sept. 16, 1983 to Kazuhiro Higashiyama and commonly assigned to the assignee of the present invention, discloses an electronic engine control system with a checking unit for sensors and actuators therein. The disclosed checking unit is adapted to be connected to the digital controller of an engine control system for applying dummy loads to sensors and actuators selectively to check the operation of those elements. The checking unit includes a plurality of operation monitors which can be turned on and off depending upon the operating state of the sensor or actuator upon checking same.

U.S. Pat. No. 4,363,092, issued on Dec. 7, 1982 to Toshimi Abo, et al. and commonly assigned to the assignee of the present invention discloses a malfunction preventing system for a microcomputer detecting failure of a microprocessor and producing an alarm signal and/or reset signal to reset the control signal to its initial state.

In addition, British Patent Application No. 2,044,485, published on Oct. 15, 1980 discloses a test system for a dynamic machine, e.g. an aircraft auxiliary power unit. A control and test system uses sensors to gather information concerning machine operation and provides control signals to actuate the machine. The processor monitors machine operation and shuts the machine down in the event of a serious fault. The cause of shutdown is recorded in a nonvolatile memory. The test system has a passive mode during operation changes which monitors inputs from the sensors and machine operation. Intermittent and continuous malfunctions which do not cause machine shutdown are recorded in the memory. An active test mode is performed when the machine is shut down, checking sensor circuits, machine control elements and the control and protection processor programs. Faults are recorded in the memory and other faults stored in the memory are retrieved and displayed on a display unit for maintenance and repair personnel.

A similar monitor system is also disclosed in the published West German Patent Application No. 32 29 411 which corresponds to the co-pending U.S. patent application Ser. No. 405,426, filed Aug. 5, 1982, which discloses an electronic device with self-monitor for an automotive vehicle. A self-monitor system for an automotive electronic control system such as an engine control system, an electronic anti-skid brake control system or an electronic automatic power transmission control system, is adapted to check each segment of the electronic control system in order to detect faulty segments. To detect faulty segments, the self-monitor system checks inputs and outputs of the electronic control system. The checked data is stored in a memory which is not erased when the power supply is turned off. The self-monitor system is associated with another automotive microprocessor which includes a display unit. The other automotive microprocessor is adapted to display the results of the checking operation of the self-monitor system in response to a display request manually inputted via a manual unit to display identification of the faulty segment and/or the error condition thereof. The monitor can also be associated with a fault indicator, such as an LED, which turns on in response to detection of error in any of the segments.

In such conventional self-monitor systems, the monitor system must be reset manually after maintenance of faulty elements has been completed in order to clear the monitor memory. If the system is inadvertently not reset after maintenance and some other faulty segment or element should arise while driving the vehicle, unnnecessary maintenance operations would be performed due to erroneous indication of the previous malfunction.

SUMMARY OF THE INVENTION

Therefore, it is a principle object of the present invention to provide a self-monitor system for an automotive control system which is reset automatically under given conditions after maintenance.

Another and more specific object of the invention is to provide a self-monitor system for detecting malfunction of elements of a control system for an automotive vehicle device which is initialized automatically in response to vehicle operation after maintenance.

In order to accomplish the above-mentioned and other objects, a failure-monitor system for a control system, according to the present invention, includes one or more fault indicators which are adapted to turn on in response to failure of corresponding elements in the control system, The failure-monitor system is associated with a preselected switch operative for driving the vehicle, such as an ignition switch, and responsive to closing of the switch to initialize the failure-monitor system after maintenance has been completed. The failure-monitor system also includes an alarm indicator which is turned on when malfunction of one of the segments or elements of the control system is detected.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for understanding and explanation only.

In the drawings.

DESCRIPTION OF THE PREFERRED EMBODIMENT

Figure 1:
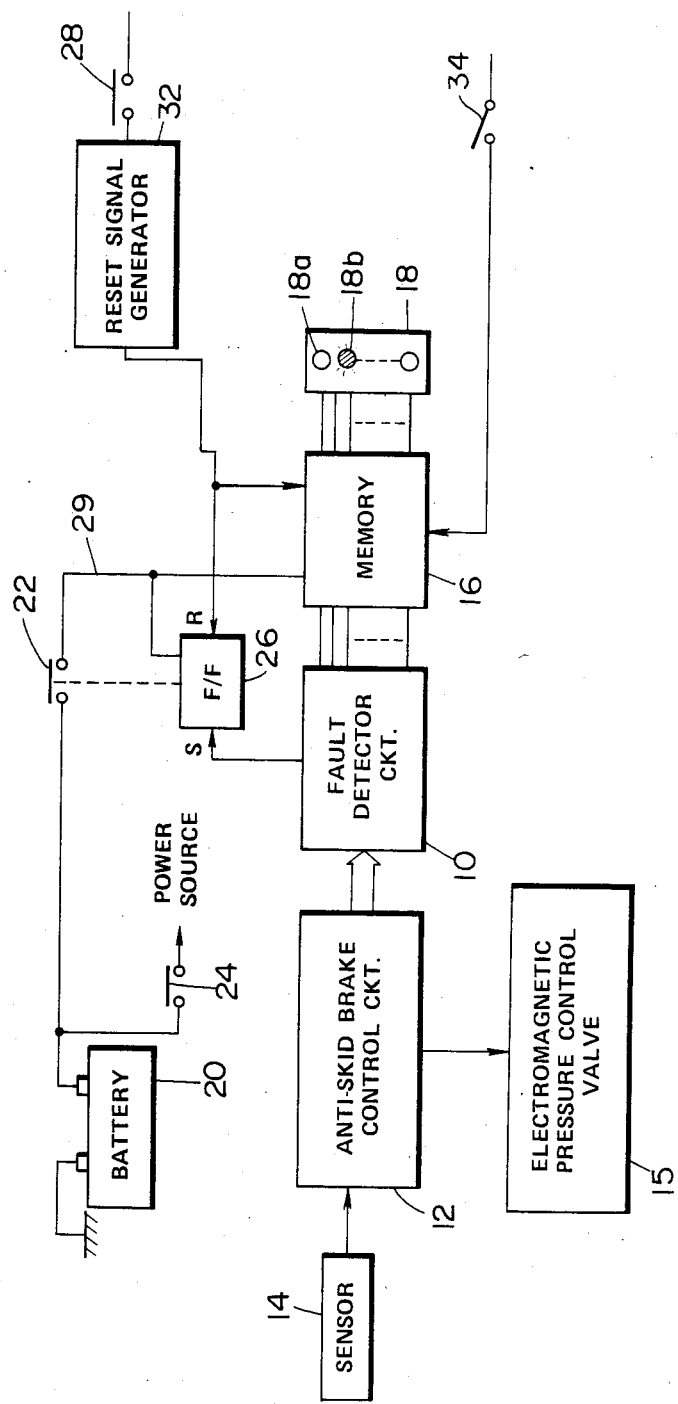
FIG. 1 is a schematic block diagram of the preferred embodiment of a failure-monitor system according to the present invention, which is illustrated in an exemplary form applicable to an electronic anti-skid brake control system.

Referring now to the drawings, particularly to FIG. 1, the preferred embodiment of a failure-monitor system includes a fault detector circuit 10 which is connected to an anti-skid brake control system 12. The anti-skid brake control system 12 employs one or more sensors 14 for detecting the peripheral speed of vehicle wheels and producing brake control variables for the control system. The sensor 14, when operating normally, produces a sensor signal having a value representative of the detected peripheral speed of the vehicle wheel. The anti-skid brake control system 12 further includes one or more electromagnetic pressure control valves 15 for controlling the hydraulic brake pressure applied to wheel cylinders which apply braking force to the wheels.

Such anti-skid brake control systems have been disclosed in Published Japanese Patent Application (Tokko) No. Showa 55-28900, published on July 31, 1980. In addition, U.S. Pat. No. 4,267,575, issued on May 12, 1981 to Peter Bounds discloses a microprocessor-based control system performing anti-skid brake control. The contents of the above-identified publications are hereby incorporated by reference.

It should be appreciated that, though the disclosure of the preferred embodiment of the failure-monitor system is directed to application to an anti-skid brake control system, the same system can be applied to engine control systems, automatic power transmission control system, automatic air conditioner control systems and so forth.

The fault detector circuit 10 is also connected to a nonvolatile memory 16 for storing data related to faulty elements. The memory 16 is associated with a fault indicator unit 18 which includes one or more indicators 18a, 18b .... The memory 16 is also connected to a vehicle battery 20 serving as an electrical power source via a back-up relay 22. The anti-skid brake control system 12 and the failure-monitor system are connected to the vehicle battery 20 via a main switch 24.

The fault detector circuit 10 is also connected to the set terminal of a flip-flop 26. The flip-flop 26 is set in response to a fault signal from the fault detector circuit 10, when one of elements of the anti-skid control system 12 is malfunctioning. The flip-flop 26 is connected for output to the back-up relay 22 so as to energize the latter when set. As long as the back-up relay 22 is energized, a back-up circuit 29 connecting the vehicle battery 20 to the memory 16 is established to supply back-up current to the memory. Since the back-up circuit 29 bypasses the main switch 24, the power supply to the memory is maintained through the back-up circuit 29 even when the main switch 24 is turned off.

A monitor switch 34 is connected to the memory 16 and is manually operative for reading out the content of the memory with respect to the faulty element.

The reset terminal of the flip-flop 26 is connected to an operation switch for the vehicle. In practice, the operation switch will be selected from among the switches necessary for operation of the vehicle during driving. In the shown embodiment, an ignition switch 28 is used as the operation switch. A reset signal generator 32 is interposed between the flip-flop 26 and the ignition switch 28. The reset signal generator 32 is adapted to output a reset signal to the reset terminal of the flip-flop 26 and to the memory 16 to clear the memory when the ignition switch 28 is turned to a predetermined position.

As is well known, the ignition switch 28 of the vehicle can be turned to any of various operating positions, e.g. ACC position, IGN position, and START position. In the ACC position, electrical equipment such as a radio and an air conditioner are supplied with power, in the IGN position, an ignition coil is supplied with electrical power through the IGN circuit, and in the START position, the ACC circuit for electrical equipment is broken and the starter motor is connected to the battery to be actuated through the starter circuit. After completing the engine start-up operation, the engine continuously supplies power to the ignition coil and the electrical equipment.

Figure 2:
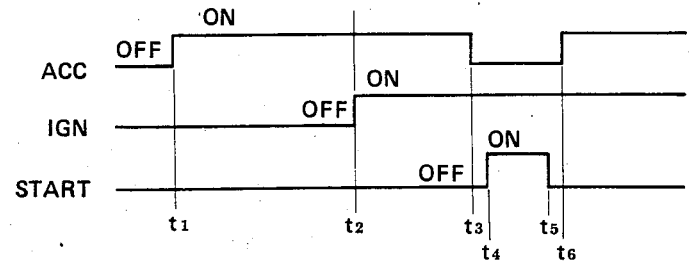
FIG. 2 is a timing chart of operation of the failure-monitor system of FIG. 1.

FIG. 2 is a chart of power supply as a function of the ignition switch positions. In order to start the engine, the ignition switch 28 is operated. The ignition switch is first turned to the ACC position at a time $t_1$. By turning to the ACC position, the ACC circuit is closed to start power supply to the electrical equipment of the vehicle. By turning the ignition switch 28 further, the IGN position is established in which an ignition circuit is closed to start supply power to the ignition coil at a time $t_2$. By finally turning the ignition switch to the START position, the ACC circuit is broken at a time $t_3$ and thereafter the START position of the ignition switch is established at a time $t_4$. Power supply to the starter motor is then started to actuate the starter motor and so start the engine. When engine cranking is finished at a time $t_5$, the ignition switch 28 is returned to the IGN position to continue power supply to the ignition coil via the ignition circuit and to restart power supply to the electrical accessories at a time $t_6$.

In the shown embodiment, the reset signal generator 32 is responsive to actuation of the ignition switch 28 to the ACC position to produce the reset signal. The circuitry of the reset signal generator 32 will be described herebelow with reference to FIG. 3.

Figure 3:
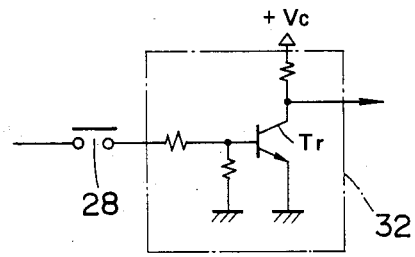
FIG. 3 is a circuit diagram of a reset signal generator in the failure-monitor circuit of FIG. 1.

As shown in FIG. 3, the reset signal generator 32 comprises a transistor $T_r$, the base electrode of which is connected to the ignition switch 28. On the other hand, the collector and emitter electrodes of the transistor $T_r$ are connected to power source $+V_c$ and ground, respectively. As long as the ignition switch 28 remains in the ACC position, the transistor $T_r$ remains conductive, thus connecting the power source to ground. When the ignition switch is turned to the START position, then the transistor is rendered non-conductive, thus allowing a bias voltage to build up at the collector electrode. The bias voltage at the collector electrode of the transistor $T_r$ serves as the reset signal.

Figure 4:
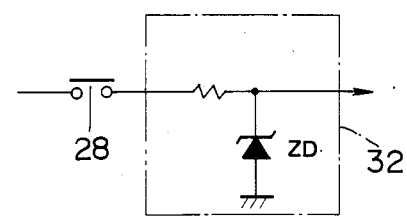
FIG. 4 is a circuit diagram of another embodiment of the reset signal generator in FIG. 1.

FIG. 4 shows a modification of the reset signal generator of FIG. 3. In this embodiment, the reset signal generator becomes active in response to actuation of the ignition switch to the START position. Therefore, the reset signal generator 32 is connected to the START terminal of the ignition switch 28. The reset signal generator 32 comprises a Zenor diode responsive to closing of the START terminal to produce a constant-voltage reset signal.

Figure 5:
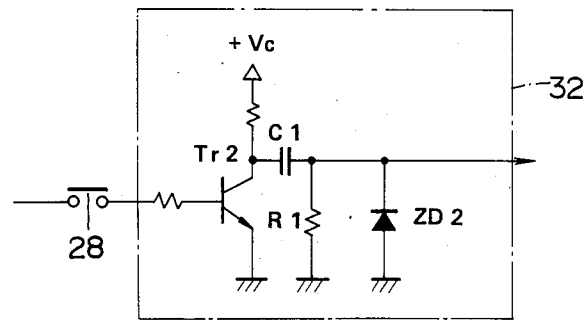
FIG. 5 is a circuit diagram showing yet another embodiment of the reset signal generator.

FIG. 5 shows another modification of the reset signal generator of FIG. 3. As in the aforementioned modification, the reset signal generator of this modification is connected to the START terminal of the ignition switch 28. The reset signal generator 32 is responsive to movement of the ignition switch contact into contact with the START terminal to produce the reset signal.

The reset signal generator 32 comprises a switching transistor $T_{r2}$, a capacitor $C_1$, a resistor $R_1$ and a Zenor diode $ZD_2$. The transistor $T_{r2}$, connected as in the circuit of FIG. 3, is responsive to closing of the START terminal and thus to the rising edge of the START signal of FIG. 2 to turn on. In this case, the collector of transistor $T_{r2}$ is grounded. When the START terminal opens and thus the START signal goes low, a bias voltage is produced at the collector electrode of the transistor $T_{r2}$. The capacitor $C_1$ and the resistor $R_1$ differentiate the bias voltage at the collector electrode of the transistor and produce a pulse signal. The amplitude of the pulse is regulated by the Zenor diode $ZD_2$ so that the pulse is output as the reset signal with a given constant voltage.

Various kinds of failure detectors may be employed to detect faulty elements of the anti-skid brake control system. For example, the anti-skid brake control system may perform a self-checking operation by applying dummy loads to actuators and indicators. A device and procedure for performing self-checking operation upon cold start is disclosed in the co-pending U.S. patent application filed on the same day, with Convention Priority based on Japanese Patent Application No. Showa 58-84904, by the same applicant and assigned to the assignee of the present invention, which is entitled "Digital Control System with Error Monitor Operative upon Starting System Operation". The contents of the above-identified co-pending application are hereby incorporated by reference. Alternatively, in order to check for drops in the vehicle battery voltage, battery voltage may be continuously monitored. A procedure for monitoring the battery voltage and for performing a back-up operation is disclosed in the co-pending U.S. patent application filed on the same day with Convention Priority based on Japanese Patent Application No. Showa 58-84905 by the same applicant and assigned to the assignee of the present invention, which is entitled "Anti-Skid Brake Control System with Fail-Safe System Responsive to Abnormal Power Supply". The contents of the above-identified co-pending application is also hereby incorporated by reference. In addition, the co-pending U.S. patent application, entitled "Anti-Skid Control System with a Plurality of Independently Operative Digital Controllers", with Convention Priority based on Japanese Patent Application Nos. Showa 58-102919 and 58-109308, by Jun Kubo and assigned to the same assignee, discloses a method and device for checking sensors. The contents of the above-identified co-pending application is also hereby incorporated by reference. Finally, a procedure for identifying faulty elements has been disclosed in the aforementioned co-pending U.S. patent application Ser. No. 405,426. The contents of the co-pending application are hereby incorporated by reference.

In operation, the fault detector circuit 10 incorporates various detectors for detecting malfunction of corresponding elements. The fault detector circuit 10 produces the fault signal identifying the faulty element in the control system. The memory 16 has a pluarality of memory blocks corresponding to the elements of the antiskid control system to be monitored and adapted to store fault ID data when malfunction of the corresponding element is detected. When the monitor switch 34 is turned on, the memory 16 sends an indication command to the fault indicator unit 18 to turn on the indicator 18a, 18b . . . corresponding to the faulty element.

At the same time, the fault signal is sent to the flip-flop 26 to set the latter. The back-up relay 22 is energized by the set output signal of flip-flop 26 to directly connect the battery 20 to the memory 16 via the back-up circuit 29 in order to preserve the contents of the memory.

Maintenance will be performed with reference to the fault indicator unit 18, of which one or more indicators 18a, 18b . . . are turned on due to failure of the corresponding element. This will facilitate maintenance in the factory or maintenance shop.

After completing maintenance, the ignition switch 28 will be operated to start the engine. Since the reset signal generator 32 produces the reset signal in response to actuation of the ignition switch to the preselected position, the memory 16 will then be cleared. In addition, the reset signal is sent to the flip-flop 26 to reset the latter. Thus, power supply to the memory 16 via the back-up circuit 29 is broken due to deenergization of the back-up relay 22.

Therefore, the failure-monitor system can be automatically initialized by normal vehicle operation immediately after completion of maintenance of the faulty element.

As set forth above, the present invention fulfills all of the objects and advantages sought therefor.

What is claimed is:

1. A failure-monitor system for an automotive control system comprising:
    a power source;
    a detector for detecting failure of elements of the control system and producing a fault signal identifying the faulty element;
    a memory for storing said fault signal identifying the faulty element;
    a display unit including a plurality of indicators, each corresponding to one of the elements of said control system, said display unit being associated with said memory for turning on the one of said indicators corresponding to the faulty element identified by the contents of said memory;
    a reset signal generator associated with a preselected vehicle switch operated during normal vehicle driving, and responsive to said vehicle switch being in a predetermined position to produce a reset signal for resetting said memory; and
    a back-up circuit responsive to said fault signal of said detector to connect said memory to said power source bypassing a system main switch.

2. The failure-monitor system as set forth in claim 1, wherein said back-up circuit is responsive to said reset signal to block electrical communication between the power source and said memory therethrough.

3. The failure-monitor system as set forth in claim 2, wherein said vehicle switch is an ignition switch.

4. The failure-monitor system as set forth in claim 3, wherein said reset signal generator is responsive to said ignition switch being in a START position for performing engine cranking.

5. The failure-monitor system as set forth in claim 3, wherein said reset signal generator is responsive to said ignition switch being in an IGN position for supplying electrical power to an engine ignition system.

6. A method for facilitating maintenance and repair of a control system in an automotive vehicle, comprising the steps of:

detecting malfunction of any of a plurality of elements of the control system;

storing, in a memory storage device, data corresponding to the detected malfunctioning element;

in response to detection of a malfunctioning element, coupling said memory storage device to a back-up circuit including a vehicle battery by directly connecting said memory storage device to said vehicle battery and bypassing a system main switch between said vehicle battery and said control system.

* * * * *